US012236946B2

(12) United States Patent
Assa et al.

(10) Patent No.: US 12,236,946 B2
(45) Date of Patent: Feb. 25, 2025

(54) GROUPING SIMILAR WORDS IN A LANGUAGE MODEL

(71) Applicant: Snap Inc., Santa Monica, CA (US)

(72) Inventors: Jacob Assa, New York, NY (US); Alan Bekker, Givaat Shmuel (IL); Zach Moshe, Tel Aviv (IL)

(73) Assignee: Snap Inc.

( * ) Notice: Subject to any disclaimer, the term of this patent is extended or adjusted under 35 U.S.C. 154(b) by 225 days.

(21) Appl. No.: 17/821,431

(22) Filed: Aug. 22, 2022

(65) Prior Publication Data

US 2024/0062752 A1    Feb. 22, 2024

(51) Int. Cl.
*G10L 15/197* (2013.01)

(52) U.S. Cl.
CPC ................................. *G10L 15/197* (2013.01)

(58) Field of Classification Search
CPC ............................... G10L 15/197; G06F 40/20
See application file for complete search history.

(56) References Cited

U.S. PATENT DOCUMENTS

| | | | | |
|---|---|---|---|---|
| 8,589,164 | B1* | 11/2013 | Mengibar | G06F 16/3329 704/10 |
| 10,430,730 | B2* | 10/2019 | Cheng | G06Q 10/02 |
| 2009/0119235 | A1* | 5/2009 | Kanungo | G06F 40/295 704/9 |
| 2012/0296650 | A1* | 11/2012 | Bates | G10L 15/197 704/E17.001 |
| 2015/0051899 | A1* | 2/2015 | Bodenstab | G06F 40/20 704/9 |
| 2015/0379988 | A1* | 12/2015 | Corfield | G10L 15/32 704/255 |
| 2019/0102374 | A1* | 4/2019 | Tiwari | G06F 40/284 |

OTHER PUBLICATIONS

Naptali et al. "Class-Based N-Gram Language Model for New Words Using Out-of-Vocabulary to In-Vocabulary Similarity" IEICE Trans. Inf. & Syst., Sep. 2012 (Year: 2012).*
"International Application Serial No. PCT US2023 072579, International Search Report mailed Nov. 24, 2023", 4 pgs.

(Continued)

*Primary Examiner* — Bhavesh M Mehta
*Assistant Examiner* — Darioush Agahi
(74) *Attorney, Agent, or Firm* — Schwegman Lundberg & Woessner, P.A.

(57) ABSTRACT

Systems and methods are provided for performing automated speech recognition. The systems and methods access a LM that includes a plurality of n-grams, each of the plurality of n-grams comprising a respective sequence of words and corresponding LM score and receive a list of words associated with a group classification, each word in the list of words being associated with a respective weight. The systems and method compute, based on the LM scores of the plurality of n-grams, a probability that a given word in the list of words associated with the group classification appears in an n-gram in the LM comprising an individual sequence of words and adds one or more new n-grams to the LM comprising one or more words in the list of words in combination with the individual sequence of words and associated with a particular LM score based on the computed probability.

20 Claims, 10 Drawing Sheets

(56) References Cited

OTHER PUBLICATIONS

"International Application Serial No. PCT US2023 072579, Written Opinion mailed Nov. 24, 2023", 5 pgs.

Goodman, J T, "Putting it all together: language model combination", Acoustics, Speech, and Signal Processing, 2000. ICASSP '00. Proceeding S. 2000 IEEE International Conference on Jun. 5-9, 2000, Piscataway, NI, USA,IEEE, vol. 3, (Jun. 5, 2000), 1647-1650.

Naptali, Welly, "Class-Based N-Gram Language Model for New Words Using Out-of-Vocabulary to In-Vocabulary Similarity", IEICE Transactions on Information and Systems vol. E95.D, No. 9, (Sep. 1, 2012), 2308-2317.

Welly, Naptali, "Topic-Dependent Language Model with Voting on Noun History", ACM Transactions on Asian Language Information Processing, Association for Computing Machinery, New York, NY, US, vol. 9, No. 2, (Jun. 1, 2010), 1-31.

\* cited by examiner

| CITY 614 | WEIGHT 624 | ORIGINAL SCORE 634 | SCORE AFTER CHANGE | SCORE AFTER NORMALIZATION |
|---|---|---|---|---|
| LONDON 616 | 5 626 | 20% 636 | 20% | ~15.7% |
| PARIS | 5 | 15% | 15% | ~11.8% |
| BERLIN 612 | 3 622 | 10% 632 | 10% | ~7.8% 642 |
| MADRID | 5 | UNKNOWN | 17.5% | ~13.8% 652 |
| TOKYO | 3 | UNKNOWN | 10% | ~7.8% |

*FIG. 6*

GROUPING SIMILAR WORDS IN A LANGUAGE MODEL

TECHNICAL FIELD

The present disclosure generally relates to the technical field of automated speech recognition (ASR).

BACKGROUND

As the popularity of social networking grows, social networks are expanding their capabilities. To improve ease of use, social networks are integrating more and more functions such that a user may accomplish many or even most of their computer-based tasks within the social network itself. Some social networks allow users to control various operations using speech.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 6 illustrates an example word list, in accordance with some examples.

DETAILED DESCRIPTION

Figure 1:
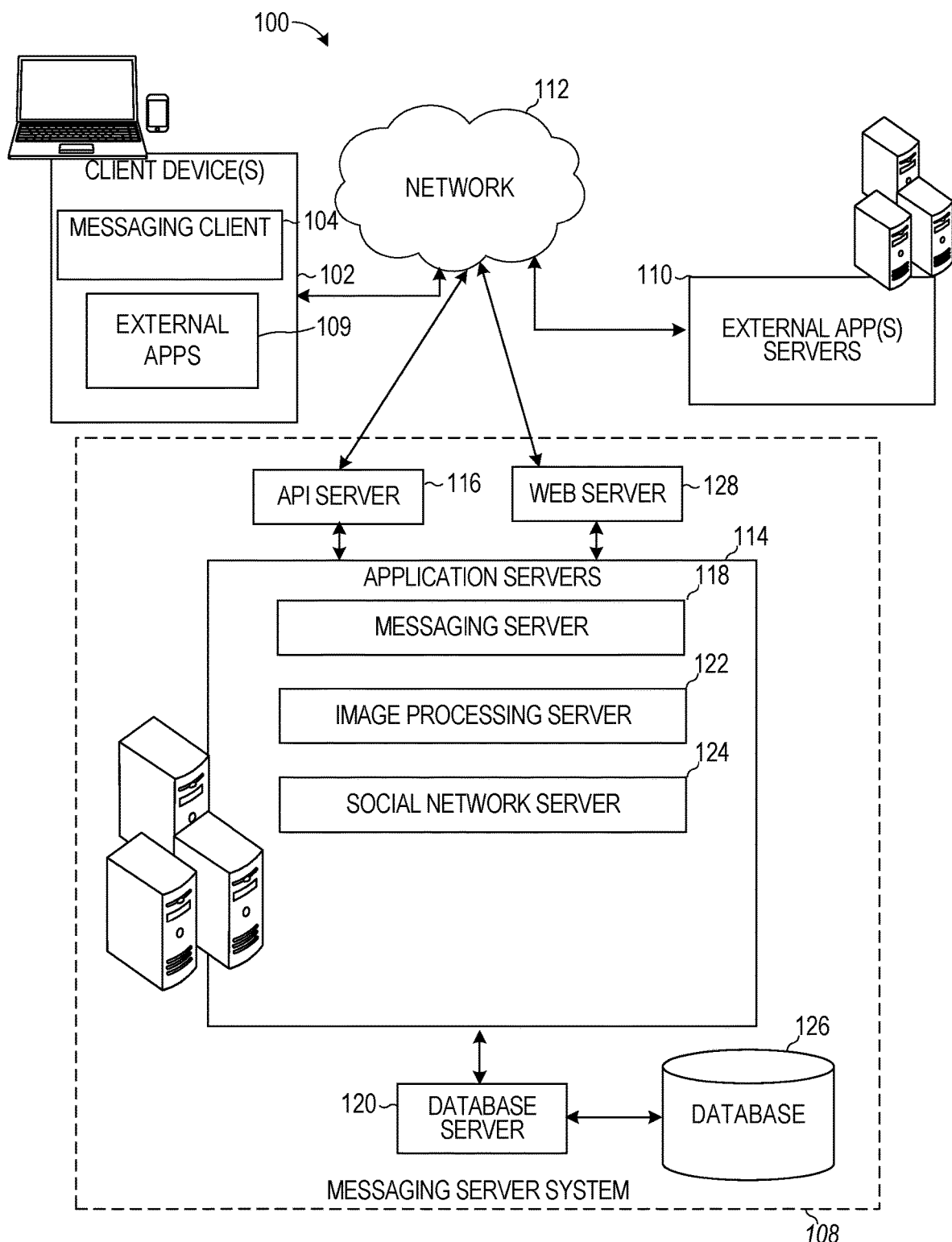
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Automatic speech recognition (ASR) engines are often composed of an acoustic component and a decoder. The acoustic component converts the user voice into logits of inferred characters of phonemes, and the decoder applies a beam search and a language model (LM) to determine the best combinations/alternatives of characters/phonemes as a resulting transcript. In this setup, the decoder's role is on increasing probabilities of acoustic options, according to their likelihood score (LM score) in the language model. A language model is used to determine the likelihood of a sequence of words, according to its appearance in a large language corpus. The language model initially examines the corpus, extracts a distribution model from the corpus, which it then uses in runtime to determine the likelihood of a given sequence of words. Likelihood of an n-gram can be referred to as n-gram score or LM score.

An LM typically uses a list of n-grams (sequence of n words—unigrams, bigrams, 3-grams, and so on usually until n=6) and their likelihood in the language as seen in the training corpus. The LM also implements smoothing, which is a method to determine likelihood of unseen n-grams in the corpus, by looking at a "back-off" probability for the n−1 prefix of the n-gram together with the likelihood of the n−1 suffix. For example, if the n-gram I_am_here_already is not in the LM, its likelihood would be calculated by the probability of am_here_already*(backoff probability of I_am_here). Computing the likelihood of n-grams that are not found in the LM in this way can result in poor ASR recognition and negative user experience. For example, if an n-gram is assigned an incorrect LM score, the ASR recognition can perform an undesired action or can misinterpret the intent behind the n-gram.

Some n-grams in the LM can be related to each other by subject matter because they relate to a common group, such as cities, colors, names of people, brands, and so forth. Typical systems do not consider such relationships among n-grams when performing ASR recognition. Failing to take into account such groupings of n-grams when encountering a new n-gram results in inefficiencies and poor ASR recognition. A common problem when training a LM from a text corpus is the finite amount of data to train from. Even though text corpuses are large, even enormous, they are not enough to fully generalize as a human would easily do. For example—when a person perceives a sentence like "I live in New-York", they understand that New-York is a place, and the sentence "I live in London" is valid just as much, even if the person never saw the sentence in the training set. The disclosed techniques can treat both sentences the same by treating groups of words as belonging to the same "class".

The disclosed techniques improve the ASR recognition of certain new n-grams that are related to a class of known n-grams. To improve the ASR recognition of the new n-grams, the disclosed techniques safely adjust the probability of transcribing an expected set of words/utterances, while safely maintaining probabilities of other alternatives that do not use the n-gram or word in the n-gram. The disclosed techniques allow adjustment of the ASR utterance transcription without any degradation on other utterances. The disclosed techniques can be implemented as part of the decoder (referred to as the online alternative), or by altering the language model used by the decoder as a preprocessing step (referred to as the offline alternative). Specifically, the disclosed techniques improve decoding and ASR recognition by grouping together phrases and words that are interchangeable. Sets of words are received from the user or an external source and the LM is modified to contain an n-gram for every combination of all group members with all relevant prefixes and suffixes for the group, regardless of whether they appeared together in the corpus of the LM or not.

When treating a set of words as the same class, the disclosed techniques observe the current n-grams in the LM and determine which n-grams are relevant for classing. Relevant n-grams can be those where group members can be replaced while still maintaining the valid and probable n-gram. For example, consider when classing city names together, if there exists an n-gram for (I, live, in, London), the disclosed techniques also consider any other city name instead of London, regardless of whether or not it appeared in the LM training corpus.

After deciding on the relevant n-grams, the disclosed techniques ensure that all group members are expected within these contexts (e.g., have an LM score). LMs store the probability for a suffix given a prefix or vice versa. That means that basically, all scores for the same prefix should sum to less than one since the disclosed techniques assume that it is not exposed to all possible combinations in the corpus. When the disclosed techniques change scores in the LM, the disclosed techniques preserve this property and avoids guessing or naively arbitrarily changing a probability. Rather, the disclosed techniques spread the existing probability mass differently. For every prefix, the disclosed techniques set a probability to every group member based on the probabilities of the known group members, regardless of whether it appeared in the original LM or not.

In some examples, the disclosed techniques assume that the group G of city names (g1, g2, g3, . . . ) with the weights (w1, w2, w3, . . . ) associated with each city are being classified. The weights are prior knowledge about the group that are provided from an outside source and represent how likely a member of the group is to appear by itself. If grouping together cities, the disclosed techniques can use population size as a proxy for the city name usage. For more abstract domains as colors, the disclosed techniques can use other heuristics or metrics. Similar proxies for person names are first/last names in the population, or can be extracted from an external dataset, for example company names weights can be deduced from their brand name strength.

According to the disclosed techniques, a LM is accessed that includes a plurality of n-grams, each of the plurality of n-grams including a respective sequence of words and corresponding LM score. The disclosed techniques receive a list of words associated with a group classification, each word in the list of words being associated with a respective weight. The disclosed techniques compute, based on the LM scores of the plurality of n-grams, a probability that a given word in the list of words associated with the group classification appears in an n-gram in the LM including an individual sequence of words (e.g., a same prefix when the given word is a suffix or suffix when the given word is a prefix). The disclosed techniques add one or more new n-grams to the LM including one or more words in the list of words in combination with the individual sequence of words and associated with a particular LM score based on the computed probability. In this way, the disclosed techniques improve the ASR recognition of n-grams that include one or more words related to other n-grams having previously determined LM scores.

This significantly improves the overall ability for the social network system to perform ASR to control operations and perform transcriptions of audio. In this way, the disclosed techniques provide a much more intuitive, robust, and engaging experience. This reduces the amount of computing resources needed to perform routine social networking tasks and operations.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted, third-party applications, such as external apps 109, using Applications Program Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, watermarks (combined indications of messages and reactions being read or presented to a user of a client device 102) and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages and reactions processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., watermarks, commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
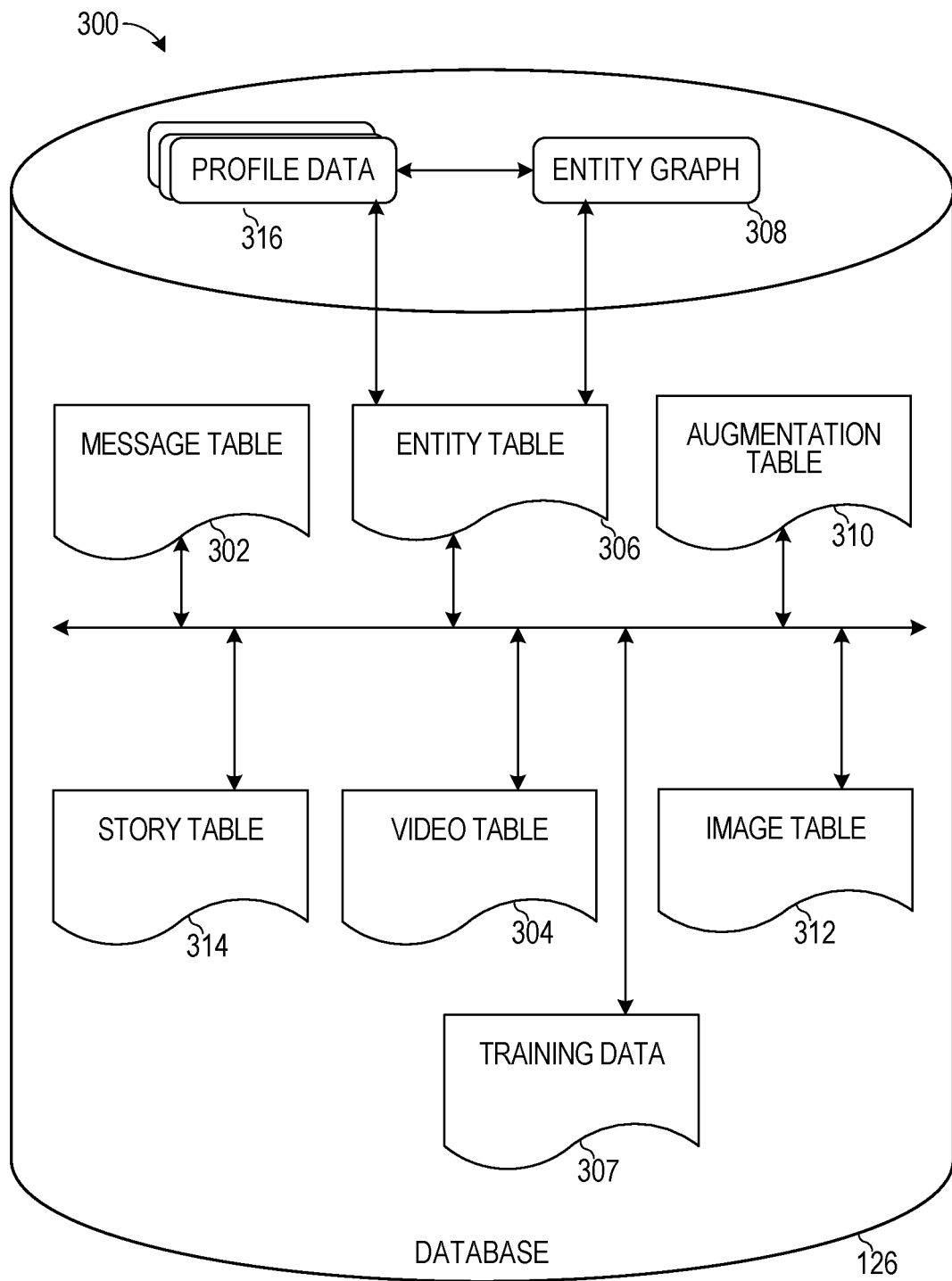
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an external application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a son file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

In some examples, the messaging client 104 can implement one or more functionalities of the word grouping ASR system 230, discussed below in connection with FIG. 5.

System Architecture

Figure 2:
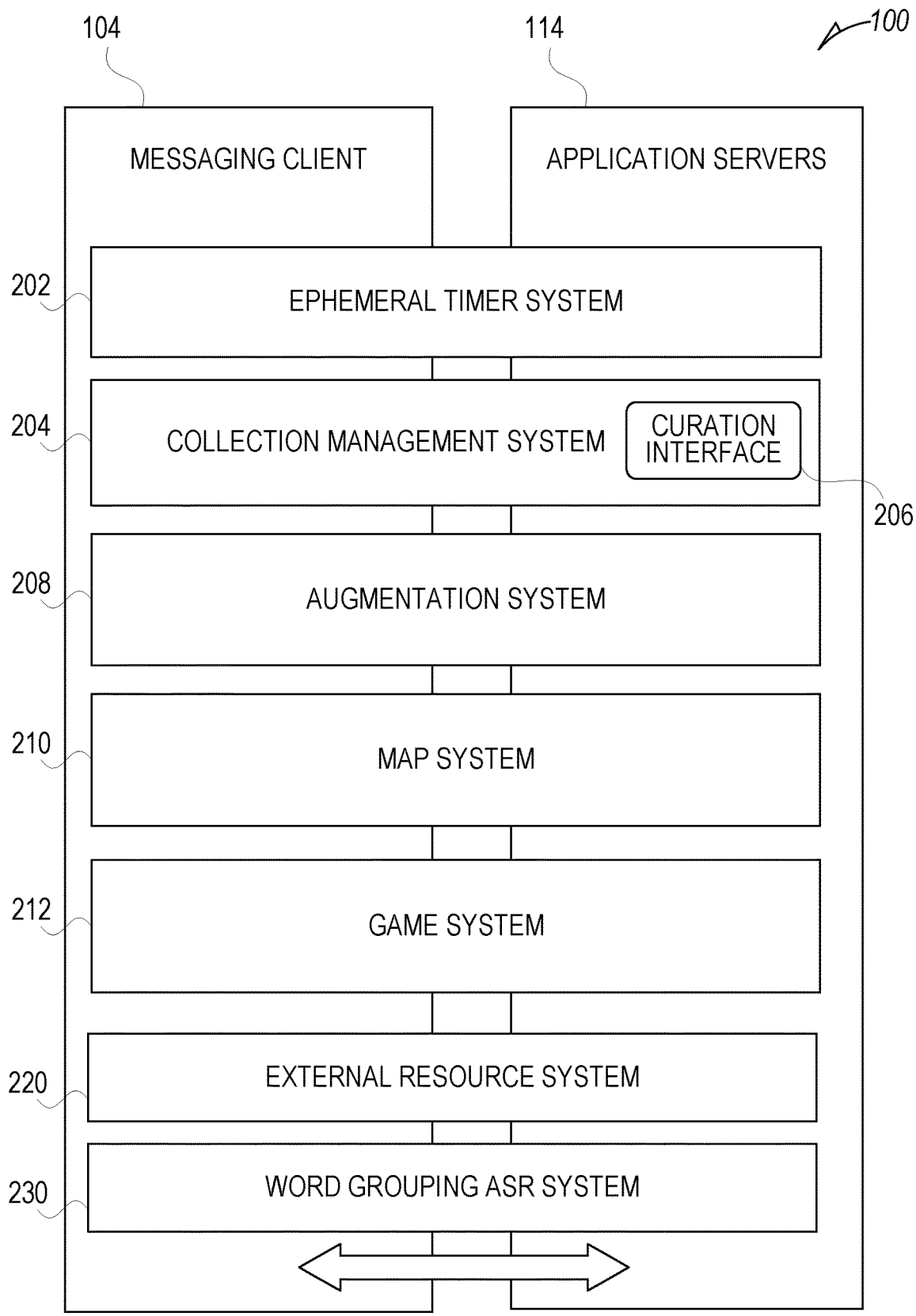
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, an external resource system 220, and a word grouping ASR system 230.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter or augmented reality item) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. The media overlay in some cases is referred to as an augmented reality item. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected, as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The augmentation system 208 allows users to create custom media overlays or augmented reality items. Such media overlays may include one or more different feature types. For example, the media overlays may include the facial tracking—based features in which one or more augmented reality items are modified based on movement of facial features detected in a received or captured image or video. As another example, the media overlays may include the audio clip-based features in which a sound clip or audio clip is associated with one or more augmented reality items that are presented in a received or captured image or video. As another example, the media overlays may include the gyroscopic or accelerometer-based features in which one or more augmented reality items are modified based on movement of the client device 102 on which a received or captured image or video is displayed. The custom media overlays can be shared with other users of the messaging application. The other users can select to launch or access the custom media overlays. In response, the features of the custom media overlays are retrieved and used to augment or modify one or more images or videos presented on client devices of the other users.

The map system 210 provides various geographic location functions, and supports the presentation of map-based media content and messages by the messaging client 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items). Based on an intent classification of the speech input and accurate transcription of the speech input, the messaging client 104 can perform game-based functions.

The external resource system 220 provides an interface for the messaging client 104 to communicate with external app(s) servers 110 to launch or access external resources. Each external resource (apps) server 110 hosts, for example, a markup language (e.g., HTML5)—based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used. Based on an intent classification of the speech input and accurate transcription of the speech input, the messaging client 104 can perform external resource-based functions.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up a menu (e.g., animates a menu as surfacing from a bottom of the screen to a middle of or other portion of the screen) for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The word grouping ASR system 230 accesses a LM that includes a plurality of n-grams, each of the plurality of n-grams including a respective sequence of words and corresponding LM score. The word grouping ASR system 230 receives a list of words associated with a group classification, each word in the list of words being associated with a respective weight. The word grouping ASR system 230 computes, based on the LM scores of the plurality of n-grams, a probability that a given word in the list of words associated with the group classification appears in an n-gram in the LM including an individual sequence of words (e.g., a same prefix when the given word is a suffix or suffix when the given word is a prefix). The word grouping ASR system 230 adds one or more new n-grams to the LM including one or more words in the list of words in combination with the individual sequence of words and associated with a particular LM score based on the computed probability. In this way, the disclosed techniques improve the ASR recognition of n-grams that include one or more words related to other n-grams having previously determined LM scores Further details of the word grouping ASR system 230 are provided in connection with FIG. 5.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interest-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then display on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Training data 307 stores a language model that includes one or more n-grams. Each of the one or more n-grams includes a word or a sequence of words along with associated LM scores. An ASR engine uses the language model stored as the training data 307 to process verbal input received from a user and perform speech-based operations based on the processed verbal input. In some examples, the ASR engine generates a transcription of the verbal input using the language model. In some examples, one or more words associated with a certain class can be added to the language model based on other n-grams in the LM that include the same class of words. This allows the ASR engines to improve the detection and recognition of a wider variety of n-grams which improves the overall user experience and efficiency of operating the client device 102.

Data Communications Architecture

Figure 4:
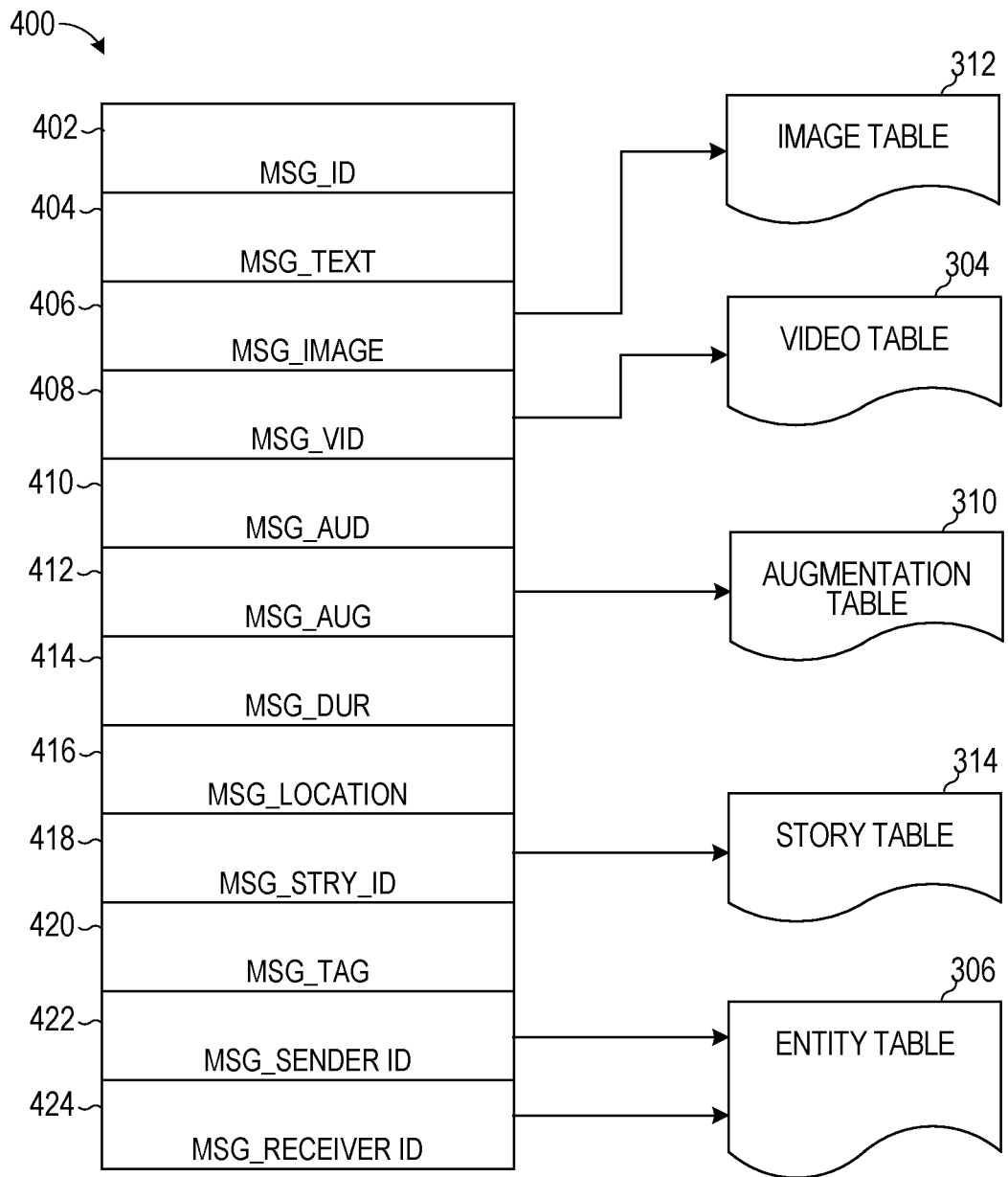
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Word Grouping ASR System

Figure 5:
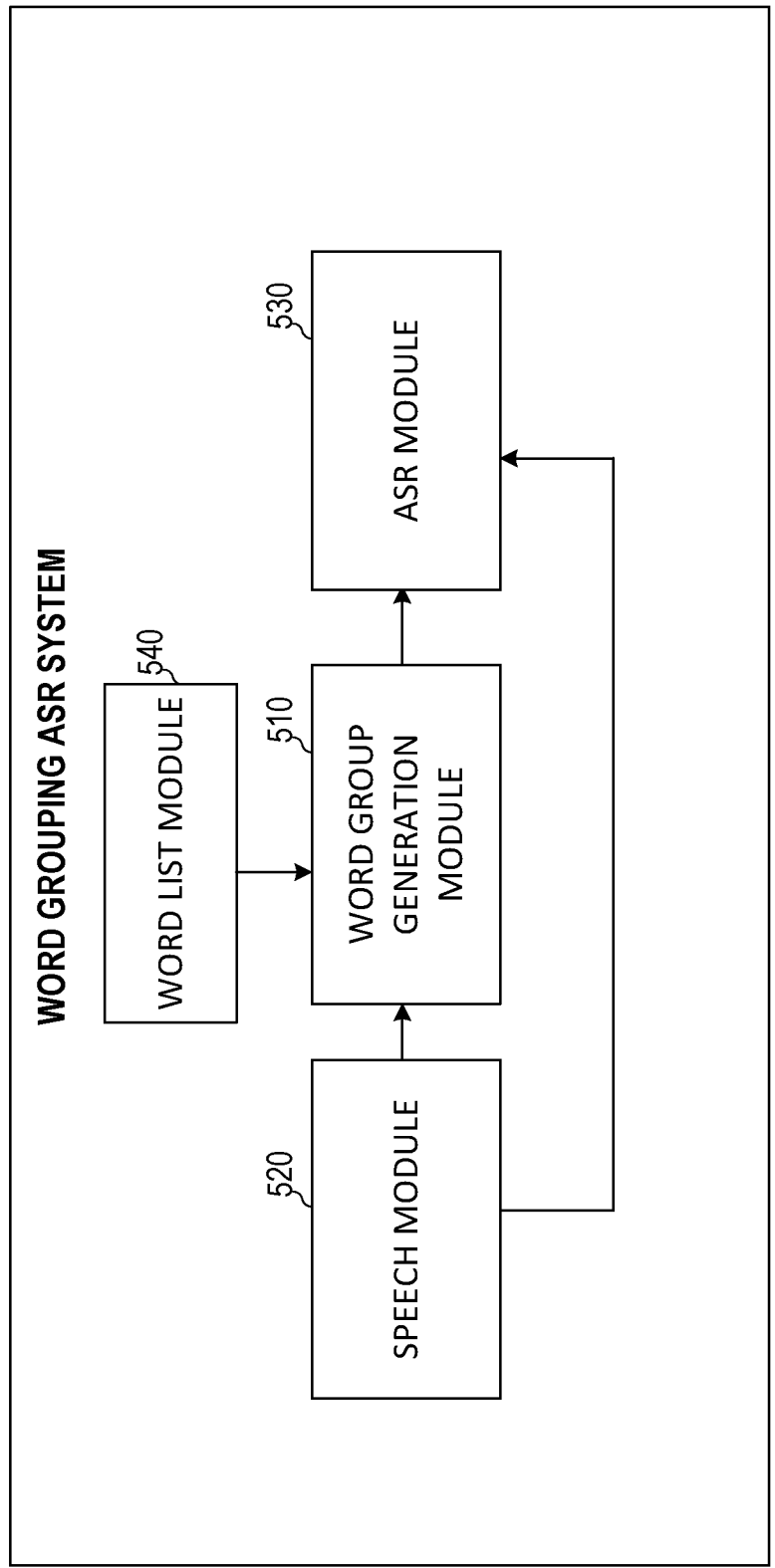
FIG. 5 illustrates the word grouping ASR system, in accordance with some examples.

FIG. 5 illustrates the word grouping ASR system 230 according to some examples. The word grouping ASR system 230 includes a speech module 520, an ASR module 530, a word list module 540, and a word group generation module 510. While all of the components are drawn as being part of the word grouping ASR system 230, any one or all of the components can be implemented by separate devices and be in geographically disparate locations.

In some examples, the word grouping ASR system 230 accesses a LM that includes a plurality of n-grams, each of the plurality of n-grams comprising a respective sequence of words and corresponding LM score. The word grouping ASR system 230 receives a list of words associated with a group classification, each word in the list of words being associated with a respective weight and computes, based on the LM scores of the plurality of n-grams, a probability that a given word in the list of words associated with the group classification appears in an n-gram in the LM comprising an individual sequence of words. The word grouping ASR system 230 adds one or more new n-grams to the LM comprising one or more words in the list of words in combination with the individual sequence of words and associated with a particular LM score based on the computed probability.

In some examples, the word grouping ASR system 230 identifies a subset of n-grams of the plurality of n-grams that includes a first portion of words in the list of words associated with the group classification in combination with the individual sequence of words. The word grouping ASR system 230 detects that a second portion of words in the list of words is excluded from the subset of n-grams and adds the one or more new n-grams to the LM including the second portion of words in the list of words in combination with the individual sequence of words. The word grouping ASR system 230 assigns one or more LM scores respectively to the one or more new n-grams based on the LM score of each n-gram in the subset of n-grams and the respective weights of the words in the list of words. In some cases, the word grouping ASR system 230 adjusts the LM scores of the subset of n-grams in response to adding the one or more new n-grams.

In some examples, the word grouping ASR system 230 queries the LM to obtain a complete list of n-grams that includes any of the words in the list of words and identifies a first portion of n-grams of the complete list of n-grams that includes a same sequence of words. The word grouping ASR system 230 computes a quantity representing a total number of n-grams in the LM that include the same sequence of words and generates a relevance metric based on a ratio of the first portion of n-grams to the quantity representing the total number of n-grams in the LM that include the same sequence of words.

In some examples, the word grouping ASR system 230 compares the relevance metric to a threshold percentage and, in response to determining that the relevance metric transgresses the threshold percentage, associates a group token with the first portion of n-grams of the complete list of n-grams that includes the same sequence of words. The word grouping ASR system 230 uses the group token to identify a subset of n-grams of the plurality of n-grams that includes the first portion of words in the list of words.

In some examples, the word grouping ASR system 230 determines that the individual sequence of words is part of a prefix of a subset of n-grams including a first portion of words of the list of words. Each word in the first portion of words of the list of words can appear as a suffix following the prefix of the subset of n-grams. In such cases, the word grouping ASR system 230 obtains a first LM score of a first n-gram in the subset of n-grams and obtains a second LM score of a second n-gram in the subset of n-grams. The word grouping ASR system 230 computes the probability as a sum of the first and second LM scores.

In some cases, the word grouping ASR system 230 identifies a second portion of words in the list of words that is excluded from the subset of n-grams comprising the individual sequence of words. The word grouping ASR system 230 combines each word in the second portion of words with the individual sequence of words to add respective n-grams of the one or more new n-grams to the subset of n-grams to form an updated subset of n-grams and distributes the probability across n-grams in the updated subset of n-grams to associate each n-gram in the updated subset of n-grams with the particular LM score.

In some examples, the word grouping ASR system 230 divides the probability across the n-grams in the updated subset of n-grams according to the respective weight of each word in the list of words.

In some examples, the word grouping ASR system 230 identifies a second portion of words in the list of words that is excluded from the subset of n-grams comprising the individual sequence of words. The word grouping ASR system 230 combines each word in the second portion of words with the individual sequence of words to add respective n-grams of the one or more new n-grams to the subset of n-grams to form an updated subset of n-grams and determines that a first word in the second portion of words has a first weight that matches a second weight associated with a second word in the first portion of words.

In some examples, the word grouping ASR system 230 obtains the LM score of a first n-gram in the updated subset of n-grams comprising the second word. The word grouping ASR system 230 associates the LM score of the first n-gram with a second n-gram in the updated subset of n-grams including the first word.

In some examples, the word grouping ASR system 230 identifies a collection of n-grams in the LM that includes the individual sequence of words. The word grouping ASR system 230 normalizes the LM scores of the collection of n-grams in response to associating the LM score of the first n-gram with the second n-gram in the updated subset of n-grams comprising the first word.

In some examples, the word grouping ASR system 230 determines that a first word in the second portion of words has a first weight that matches a third weight associated with a third word in the first portion of words. The word grouping ASR system 230 obtains the LM score of a second n-gram in the updated subset of n-grams comprising the third word and computes an average of the LM scores of the first and second n-grams. The word grouping ASR system 230 associates the average of the LM scores of the first and second n-grams with a second n-gram in the updated subset of n-grams comprising the first word.

In some examples, the word grouping ASR system 230 determines that the individual sequence of words is part of a suffix of a subset of n-grams including a first portion of words of the list of words. Each word in the first portion of words of the list of words can appear as a prefix preceding the suffix of the subset of n-grams. In such cases, the word grouping ASR system 230 computes a sum of the weights associated with the list of words and obtains a first LM score of a first n-gram in the subset of n-grams. The word grouping ASR system 230 obtains a second LM score of a second n-gram in the subset of n-grams and computes the probability as a function of a first ratio of the weight associated with a first word in the first portion of words and the computed sum combined with the first LM score and a second ratio of the weight associated with a second word in the first portion of words and the computed sum combined with the second LM score. The word grouping ASR system 230 associates the computed probability with the one or more new n-grams.

In some examples, the word grouping ASR system 230 determines that the individual sequence of words includes a second word in a first portion in the list of words. The word grouping ASR system 230 computes a first probability as a function of a first sum of one or more probabilities of the individual sequence of words and a first word in the list of words and computes a second probability as a function of a second sum of one or more probabilities of the individual sequence of words and a second word in the list of words. The word grouping ASR system 230 computes an average of the first and second probabilities as the probability.

In some examples, the word grouping ASR system 230 identifies a second portion of words in the list of words that is excluded from a subset of n-grams comprising the individual sequence of words. The word grouping ASR system 230 combines each word in the second portion of words with the individual sequence of words to add respective n-grams of the one or more new n-grams to the subset of n-grams to form an updated subset of n-grams. The word grouping ASR system 230 distributes the average of the first and second probabilities across n-grams in the updated subset of n-grams to associate each n-gram in the updated subset of n-grams with the particular LM score.

The speech module 520 is configured to receive an audio stream that includes one or more words. The audio stream can be received by recording a user speaking the one or more words and generating an audio file. In some examples, the audio stream is received through a messaging system or chat system from another user. In some examples, the audio stream is downloaded from the Internet and received from one or more websites. In some examples, the audio stream is selected from a set of pre-recorded audio streams. In such cases, a user interface is presented to a user in which a plurality of audio stream listings is presented and identified by respective icons or options. In response to receiving a user selection of an icon or option, the corresponding audio stream of the plurality of audio streams is retrieved by the speech module 520. The speech module 520 provides the audio stream including the one or more words to the ASR module 530 (which can implement an acoustic model and/or a decoder).

The ASR module 530 processes the audio stream received from the speech module 520. The ASR module 530 is configured to generate a transcription of the audio stream based on a LM that includes words or phrases that have been added by the word group generation module 510. In some examples, the ASR module 530 includes a decoder that incorporates the word-group calculation probabilities and scores (discussed above and below). Based on the word-group calculation probabilities and scores, the ASR module 530 can generate the transcription of the audio stream.

The word group generation module 510 identifies a set of n-grams in the LM that are associated with a class or classification. To do so, the word group generation module 510 receives a list of words G that include respective weights from the word list module 540. The word list module 540 generates the list of words by receiving input from a user or external source that provides a list of words corresponding to a particular class along with their weights.

In some examples, the words are names of cities, countries, or states in which case the class is places or locations. The weights of the names of the cities, countries, or states are set based on a population size, a size of the region, a population density or any other parameter. The word list module 540 accesses an almanac, atlas, database or other source of information to obtain the factual information associated with each city, country, or state and uses that information to generate the weights to associate with each of the words in the list.

In some examples, the words are first or last names of people. The weights of the first or last names of the people are based on how frequently such words appear, the number of people that have the same first and/or last name, popularity of the first and/or last name, or any other suitable parameter. The word list module 540 accesses a database, census data, or other source of information to obtain the factual information associated with each name and uses that information to generate the weights to associate with each of the words in the list.

In some examples, the words are names of numbers. The weights of the names of numbers can be set equally. In some cases, the names of the first ten or first 100 numbers can be associated with a greater weight than the weight associated with a remaining set of numbers.

In some examples, the words are names of colors. The weights of the names of colors can be set equally. In some cases, the names of the primary colors can be associated with a greater weight than the weight associated with a remaining set of colors.

The word group generation module 510 can access the LM and search the LM based on the words in the word list received from the word list module 540. For example, the word group generation module 510 retrieves from the LM any n-gram that includes one or more of the words in the word list. The word group generation module 510 identifies a subset of n-grams that pertain to the class of words by identifying a set of identical prefixes associated with one or more words in the list. For instance, the word group generation module 510 can determine that a given n-gram includes a prefix "I live in" and a suffix that includes a given word in the list (e.g., London). The word group generation module 510 can also determine that another n-gram includes the same prefix "I live in" as the given n-gram and a suffix that includes another word in the list (e.g., New York). The word group generation module 510 extracts the same prefix (sequence of words) that is associated with multiple words in the list of words and can search for other n-grams that include the same prefix but a suffix that does not include any of the words in the list, such as the n-gram "I live in peace." The word group generation module 510 generates a complete list of n-grams that include a same sequence of words (e.g., a same prefix) some of which include the words in the list of words and some of which do not include words in the list of words. Specifically, for each word in the list or words, the word group generation module 510 identifies or obtains all prefixes containing such words and creates a common set of prefixes. Then, the word group generation module 510 processes these prefixes one by one or all in parallel. For each one, all the words that have an n-gram with a particular prefix may already have a score, and the words which do not have an n-gram are added to the LM, with the score specified according to the calculation scheme, discussed above and below.

The word group generation module 510 determines that some of the n-grams in the complete list pertain to the same class associated with the words in the list. To do so, the word group generation module 510 counts how many n-grams in the complete list include one or more words in the list of words. The word group generation module 510 computes a ratio of the number of n-grams that include the one or more words in the list of words to the total number of n-grams that share the same sequence of words. This ratio is compared to a threshold value or threshold percentage. In response to determining that the ratio transgresses the threshold value or percentage, the word group generation module 510 determines that the complete list of n-grams includes n-grams associated with the same class. The word group generation module 510 forms a subset of n-grams from the complete list that include one or more words from the list of words.

For example, if the word group generation module 510 queries the LM for all known n-grams that contain any of the cities or names in G, the word group generation module 510 can get a very long list of n-grams. Some can be clearly relevant for the class (e.g., cities) in general (such as (I, live, in, % CITY %), (attractions, in, % CITY %), etc.), but some are specific to a single city and do not make sense with others. Consider the phrase (All, roads, lead, to, Rome) as such an example. To address this issue, the word group generation module 510 deals only with n-grams that are relevant to the group as a whole. For that the word group generation module 510 defines a threshold percentage, such as 10 percent for the number of members of the group that the n-gram has to appear with, in order to be considered as a relevant one. Sometimes, not all members of the group are known as unigrams, such as new cities, or members are not completely represented in the corpus. In order to account for that the threshold is calculated from the list of known group members (e.g., have a probability as a unigram).

When iterating over all relevant n-grams, the word group generation module 510 groups them together based on their "grouped form." For example, the group generation module 510 replaces all group members with a special '% GROUP %' token, such as I, live, in, % CITY %. The word group generation module 510 then iterates the grouped forms, expands back to all group members and makes sure all of them are represented in the LM. This means that the word group generation module 510 adds new n-grams, and sometimes changes scores of existing ones.

Figure 7:
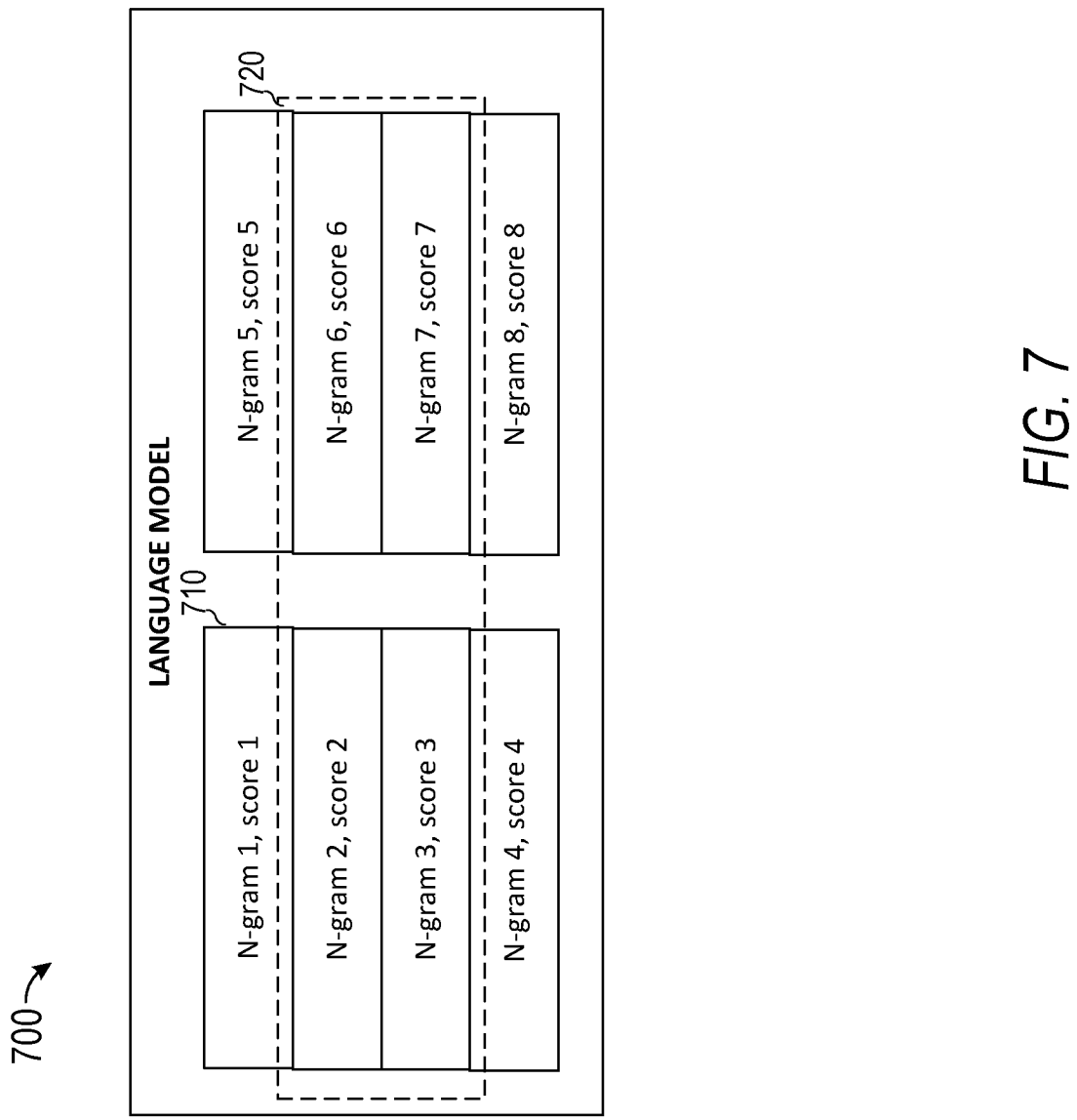
FIG. 7 illustrates an example language model, in accordance with some examples.

For example, the word group generation module 510 can generate a subset of n-grams that pertain to the class of words received from the word list module 540. Specifically, as shown in FIG. 6, a table can be used by the word group generation module 510 which is generated based on the words received from the word list module 540. The word group generation module 510 generates or accesses the table 600 that lists in a first column 610 the list of words and a second column 620 the weight associated with each word in the list of words. The word group generation module 510 accesses the LM 700 (shown in FIG. 7) to obtain the subset of n-grams 720 which include the same sequence of words in combination with the one or more words in the list of words included in the first column 610. The word group generation module 510 can also identify one or more n-grams 710 that include the same sequence of words in combination with words not included in the list of words. The word group generation module 510 computes the ratio discussed above to form the subset of n-grams 720 that pertains to the class of words.

The word group generation module 510 retrieves the LM score of each n-gram in the subset 720 that includes the one or more words in the list. The word group generation module 510 stores the LM score in the original score column 630 of the table 600. For example, the word group generation module 510 determines that a first word 614 (e.g., a city named London) is associated with a first weight 624 and is in the n-gram ("I live in London") in the LM 700. The word group generation module 510 can determine that the n-gram including the first word 614 is associated with a first LM score 634. Similarly, the word group generation module 510 can determine that a second word 616 (e.g., a city named Paris) is associated with a second weight 626 and is in the n-gram ("I live in Paris") in the LM 700. The word group generation module 510 can determine that the n-gram including the second word 616 is associated with a second LM score 636.

The word group generation module 510 can determine that a third word 612 associated with a third weight 622 is in the list of words but is not in the subset of n-grams 720. In such cases, the word group generation module 510 stores an unknown indicator in the original score column 630 for the third word 612. The word group generation module 510 can identify other words in the list of words that are not included in the subset of n-grams 720 and can similarly indicate an unknown status for the original score column 630. These words are used to generate new n-grams to be stored and added to the subset of n-grams 720 in order to improve recognition of such n-grams by the ASR module 530.

In some examples, the word group generation module 510 computes or determines a score to associate with these added n-grams based on probabilities or LM scores of other n-grams that do include one or more words of the list of words. In general, the '% GROUP %' token may appear in the prefix, as a suffix or even multiple times. The word group generation module 510 ensures that it is replaceable by any member of the group (e.g., any word in the list of words). To do so, the word group generation module 510 creates n-grams and set scores for all group members.

In some examples, the '% GROUP %' token is the suffix. For example, the same sequence of words associated with the subset of n-grams 720 can appear before any of the words in the list of words. Specifically, the sequence of words can be the phrase "I live in" that appears in the prefix portion of the n-gram and one or more words in the list of words appears in the suffix portion of the n-gram (e.g., London). In some examples, the word group generation module 510 redistributes the "probability mass" of known group elements. This ensures that the LM scores of other words are not adversely impacted, but gives a smaller probability for the group members themselves as there are normally many of them.

In such cases, the word group generation module 510 sums together all the LM scores of all group members. For example, assume there exist four cities or words in the list of words, such as London, Paris, Rome and Berlin. But only three of the words appeared as a suffix to "I live in" with the following probabilities—20%, 15%, 10%. Namely, only three of the words can be found in the subset of n-grams 720. That means that the probability of '% GROUP %' (any city) given "I live in" is 45% (e.g., 20%+15%+10%). The word group generation module 510 can allocate that 45% probability based on other criteria (for example, the weights for the group members) and creates the new n-gram for missing words. For example, the word group generation module 510 can calculate P (% CITY %|i_live_in). Since there's only one suffix here (I_live_in), the word group generation module 510 can sum together the probability for all the cities included in the subset of n-grams 720, and get P(london|i_live_in)+P(paris|i_live_in)+P(berlin|i_live_in)= 20%+15%+10%=45%. In this case, the word group generation module 510 determines that there's a probability of 45% to see a city after we see "i_live_in" but there are two cities that are not included in the subset of n-grams 720 (madrid and tokyo). The word group generation module 510 can add the words (madrid and tokyo) without changing the probabilities of the other words after "i_live_in", by taking the 45% of "the cities" and spread them across the five cities included in the list of words. In some cases, the word group generation module 510 distributes the probability equally to get 9% per city. In such cases, the word group generation module 510 generates new n-grams including the same sequence of words (e.g., "I live in") together with the words not previously found in the LM (e.g., madrid and tokyo), add these new n-grams to the subset of n-grams 720 and change the LM scores of all the n-grams in the subset of n-grams 720 accordingly. For example, the word group generation module 510 generates a score after change column 640 to reflect the updated LM scores of the subset of n-grams 720 for each word in the list of words. In this example, each n-gram in the subset of n-grams 720 including the newly added n-grams is assigned a score of 9% based on 45% total probability divided by the total quantity of words (5) in the list of words.

This approach can penalize the large cities like London and Paris that have relatively greater weights specified in the second column 620 as they have to "share" their probabilities with the new cities. One approach to mitigate this issue is by spreading the probabilities unequally. So, if the weights per city are London: 5, Paris: 5, Berlin: 3, Madrid: 1, Tokyo: 1 in the second column 620, the final probabilities (45% divided by those weights) stored in the score after change column 640 are: London 15%, Paris: 15%, Berlin: 9%, Madrid: 3%, Tokyo: 3%. If the weights per city are (London: 5, Paris: 5, Berlin: 3, Madrid: 5, Tokyo: 3) in the second column 620, the final probabilities (45% divided by those weights) stored in the score after change column 640 are: London 11%, Paris: 11%, Berlin: 6%, Madrid: 11%, Tokyo: 6%.

As another example, the word group generation module 510 can assign new LM scores to the new n-grams added to the subset of n-grams 720 that is the same or similar to an LM score of known group members who are ranked close to them. So if for example "New York" did not appear in the corpus, but "London" appeared in the corpus and has a similar weight and has a probability of 10%, the word group generation module 510 can set "New York" score to 10% as well. This however, violates the property that scores of all suffixes within a prefix must not exceed 1.0, so the word group generation module 510 can normalize all the LM scores after changing all scores. Specifically, Madrid can have an unknown LM score, but has a similar weight to London and Paris. In such cases, the LM score assigned to the new n-gram that includes the word "Madrid" can be a score of 17.5% which is the average of the LM scores of the n-grams that include the words London and Paris which have the similar weight as the weight assigned to the word Madrid. Namely, the word group generation module 510 can identify a collection of words (e.g., London, Paris, and Madrid) that have weights that are within a threshold (e.g., 1) of each other and thus, can all have the same weight of 5. The word group generation module 510 can determine that the subset of n-grams 720 includes the words London and Paris and can determine the LM scores of these n-grams are, for example, 20% and 15%, respectively. The word group generation module 510 can assign the new n-gram that includes the word "Madrid" a new LM score 642 that is computed based on an average of the determined LM scores, such as 17.5% which is the average of 20% and 15%.

Similarly, the word "Tokyo" can also have an unknown LM score because the word does not appear in the subset of n-grams 720. The word group generation module 510 determines that the word "Berlin" has an LM score associated with an n-gram in the subset of n-grams 720 that include the word "Berlin" and has a weight that is similar to the weight of the word "Tokyo." In such cases, the word group generation module 510 can set the LM score for the word "Tokyo" to 10% which is the same LM score as the n-gram in the subset of n-grams 720 that includes the word "Berlin". As a result, the word group generation module 510 stores in the column 640 the new LM scores for all the words including words that were not previously included in the subset of n-grams 720. For example, the LM scores are set as London: 20%, Paris: 15%, Berlin: 10%, Madrid: 17.5%%, Tokyo: 10%. The problem now is that the possible suffixes for "i_live_in" consist of the cities (including the new ones) and the previous "other" words ("peace" and "harmony"). If we sum all that together we get (20%+15%+ 10%+17.5%+10%)+(25%+15%+15%) which sums up to 127.5%. In order to get the prefix total score to 100%, the word group generation module 510 normalizes the LM scores to generate a score after normalization column 650 by dividing all scores (including the "other" words) by 1.275. The LM scores for "peace" and "harmony" will also change and are not reflected in the table 600. In this case, the LM score 652 for the third word 612 is stored in the score after normalization column 650.

In some examples, the word group generation module 510 determines that one or more words in the list of words appears as a prefix before a suffix that recites the sequence of words. Specifically, the word group generation module 510 can determine that the subset of n-grams 720 includes a same sequence of words (e.g. "is lovely") following one or more words in the list of words. In such cases, the word group generation module 510 estimates the probability P("lovely"|"% CITY % is"), but this prefix represents multiple concrete prefixes in the LM (where % CITY % is replaced by any of the group members). The word group generation module 510 can first expand the prefix to all possible concrete prefixes and only then estimates the desired probability. Once the word group generation module 510 estimates P("lovely"|"% CITY % is"), the word group generation module 510 goes over all concrete prefixes and makes sure all of them are represented in the LM. If the suffix is a single word (like in the given case—"lovely"), that means the word group generation module 510 has to "distribute" the score to one n-gram that takes all of it. If the suffix also contains '% CITY %', the same probability has to be expanded to multiple n-grams using the same rules as before.

For example, the word group generation module 510 estimates the probability to see "lovely" after "<any city> is". The word group generation module 510 may determine that only London and Tokyo are in the training set of the subset of n-grams 720 but according to the weights, London is 5 times more likely to appear (in general) than Tokyo. So the word group generation module 510 determines that there is a probability of 20% to see "lovely" after London, and 50% to see "lovely" after Tokyo. In such cases, the probability for "lovely" after a general city can be computed as: (Weight(London)/SUM(Weights)*P(lovely|London_is))+ (Weight(Tokyo)/SUM(Weights)*P(lovely|Tokyo_is))=(5/ 6*20%)+(1/6*50%)=16.67%+8.33%=25%.

The word group generation module 510 represents this probability for every city or word in the list of words. Since the suffix is just a single word ("lovely") there is no need to further split the 25% between different suffixes. For the words "Tokyo" and "London" the word group generation module 510 already has results from the real training set so their LM scores are not adjusted. The word group generation module 510 can create the following n-grams: Paris_is_ lovely: 25%; berlin_is_lovely: 25%; and madrid_is_lovely: 25% reflecting those words in the list of words that were not included in the subset of n-grams 720.

The group expansion also works when there are multiple group tokens in the prefix. Consider (% CITY % and % CITY %) as an example which will result in a cartesian product of all cities. When estimating the prior probability for the prefix the word group generation module 510 uses an independence assumption and multiplies the cities probabilities together. Specifically, the grouped-ngram has % CITY % both in the prefix and in the suffix. As before, the word group generation module 510 estimates the probability of the suffix given the prefix, meaning "% CITY %" given "% CITY % is". But since % CITY % is in the prefix, we have to calculate P (% CITY %|London_and), P (% CITY %|paris_and) and P (% CITY %|berlin_and) and average them according to the probability to see each city calculated by their given weights.

The probabilities can be computed as P (% CITY %|london_and)=P(paris|london_and)+P(tokyo|london_and)+P (berlin|london_and)=35%; P (% CITY %|paris_and)=P(london|paris_and)+P(madrid|paris_and)=10% P (% CITY %|berlin_and)=P(tokyo|berlin_and)=15%; Final calculation: P (% CITY %1% CITY %_is)=(W(london)/SUM(W) *P (% CITY %|london_and))+(W(paris)/SUM(W)*P (% CITY %|paris_and))+(W(berlin)/SUM(W)*P (% CITY %|berlin_and))=(5/15*35%)+(5/15*10%)+(3/15*15%)= 11.67%+3.33%+3%=18%. The word group generation module 510 can only determine three prefixes in the training data (london_and, paris_and, berlin_and) (e.g., in the subset of n-grams 720) but knows there should have been 5 (plus tokyo and madrid) because the list of words include 5 words. For every one of the words, the word group generation module 510 distributes the 18% probability for a general city among all cities (suffixes). The word group generation module 510 can either take the 18% and divide it equally among the five cities or words, such as according to their weights and override the LM scores in the subset of n-grams 720, or assign every unknown city with a probability of a similar city and then normalize all scores so the total score does not surpass 100%. For the "unknown" cities Madrid and Tokyo, where the word group generation module 510 does not find prior n-grams in the LM (e.g., in the subset of n-grams 720), the word group generation module 510 divides the 18% by the weights. For those suffixes, the word group generation module 510 creates new n-grams for every city (2 prefixes, 5 suffixes each=10 new n-grams).

In some cases, the word list module 540 can dynamically update the list of words provided to the word group generation module 510. Each time the word group generation module 510 receives an update to the list of words, the word group generation module 510 performs the above process and steps to recompute the LM scores of the corresponding n-grams that include the updated list of words. In some cases, the word list module 540 accesses local and private data that is on a client device 102. In such cases, the word list module 540 prevents such private data form being shared outside of the client device 102 without prior authorization from the user. The word list module 540 can generate the list of words using the private data, such as names of friends of a user on the messaging client 104. These names can be assigned greater weights than other names that are not in the list of friends stored on the client device 102. The word list module 540 can send that list of names to the word group generation module 510 in order to improve ASR recognition of any n-gram that features or includes a name in the list of names. The weights assigned to the list of names can be dynamically updated based on conversations the user is engaged in. For example, if a user engages in conversation with a friend associated with a first name more frequently than another friend associated with a second name, the word list module 540 can store a higher weight for the first name than the second name. This in turn causes the word group generation module 510 to compute a higher LM score for one or more n-grams that include the first name than one or more n-grams that include the second name.

Figure 8:
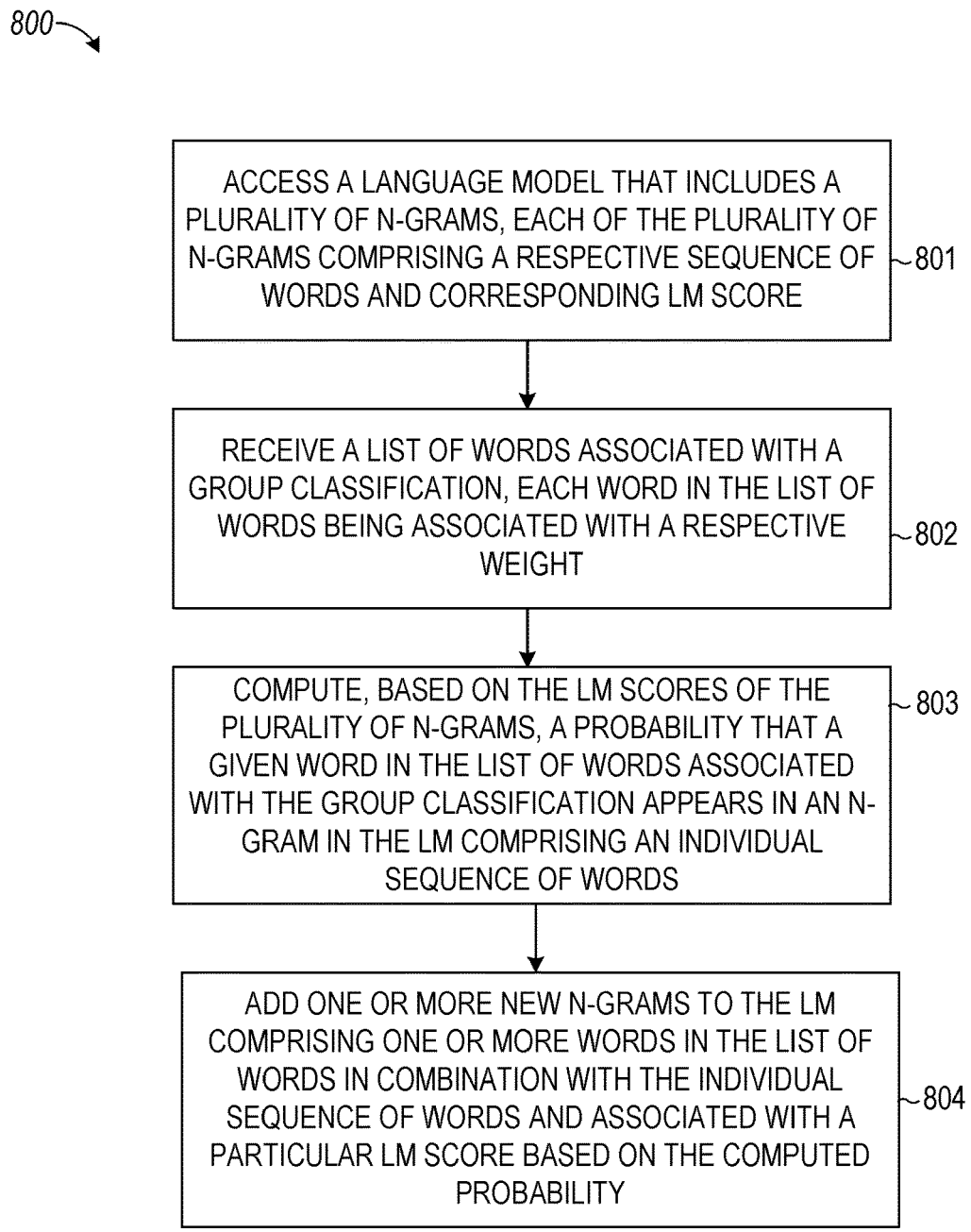
FIG. 8 is a flowchart illustrating example operations of the word grouping ASR system, according to some examples.

FIG. 8 is a flowchart illustrating example operations of the messaging client 104 in performing process 800, according to some examples. The process 800 may be embodied in computer-readable instructions for execution by one or more processors such that the operations of the process 800 may be performed in part or in whole by the functional components of the messaging server system 108; accordingly, the process 800 is described below by way of example with reference thereto. However, in other examples at least some of the operations of the process 800 may be deployed on various other hardware configurations. The operations in the process 800 can be performed in any order, in parallel, or may be entirely skipped and omitted.

At operation 801, the word grouping ASR system 230 accesses a LM that includes a plurality of n-grams, each of the plurality of n-grams comprising a respective sequence of words and corresponding LM score, as discussed above.

At operation 802, the word grouping ASR system 230 receives a list of words associated with a group classification, each word in the list of words being associated with a respective weight, as discussed above.

At operation 803, the word grouping ASR system 230 computes, based on the LM scores of the plurality of n-grams, a probability that a given word in the list of words associated with the group classification appears in an n-gram in the LM comprising an individual sequence of words, as discussed above.

At operation 804, the word grouping ASR system 230 adds one or more new n-grams to the LM comprising one or more words in the list of words in combination with the individual sequence of words and associated with a particular LM score based on the computed probability, as discussed above.

Machine Architecture

Figure 9:
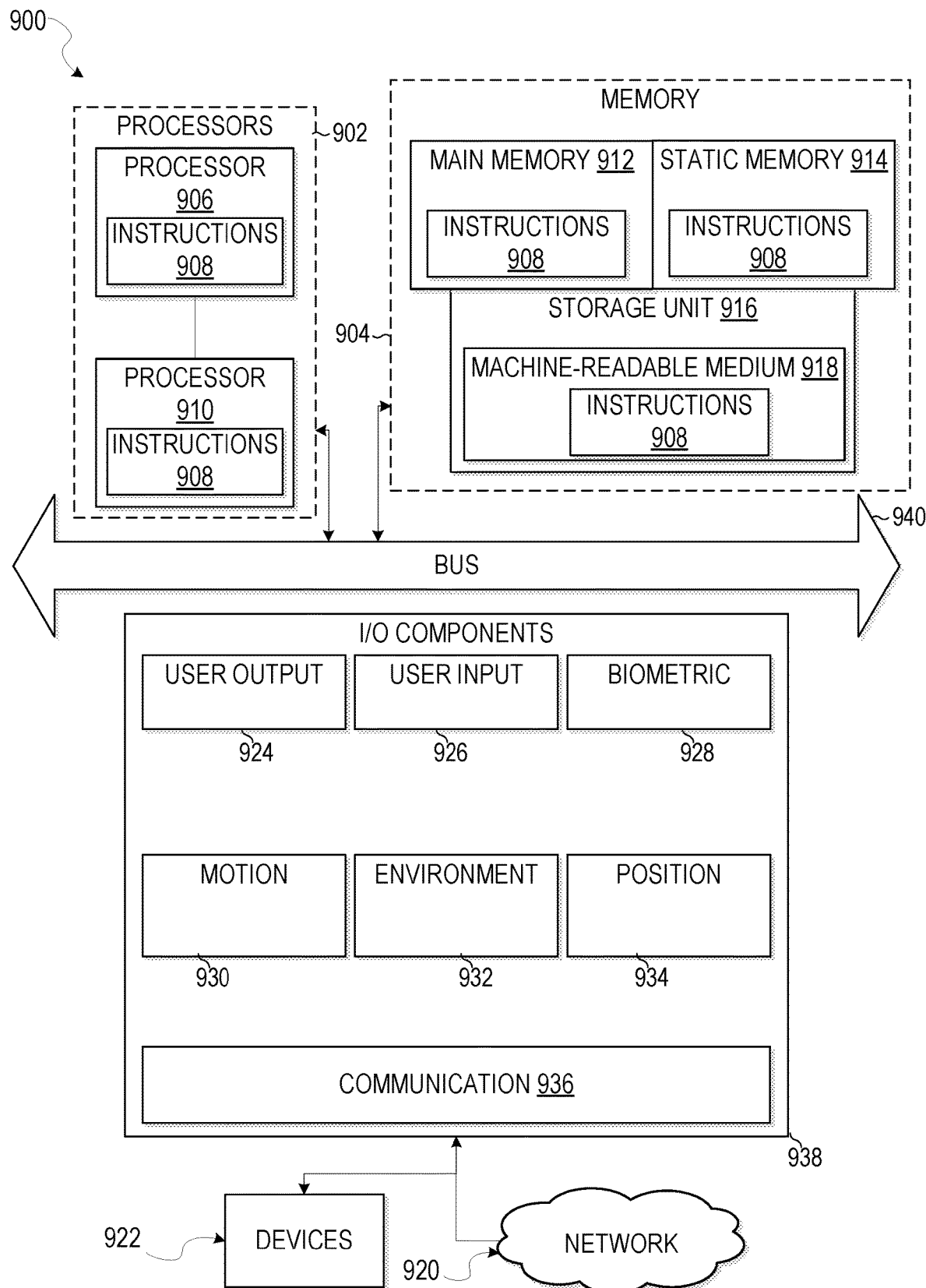
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 912, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple camera systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
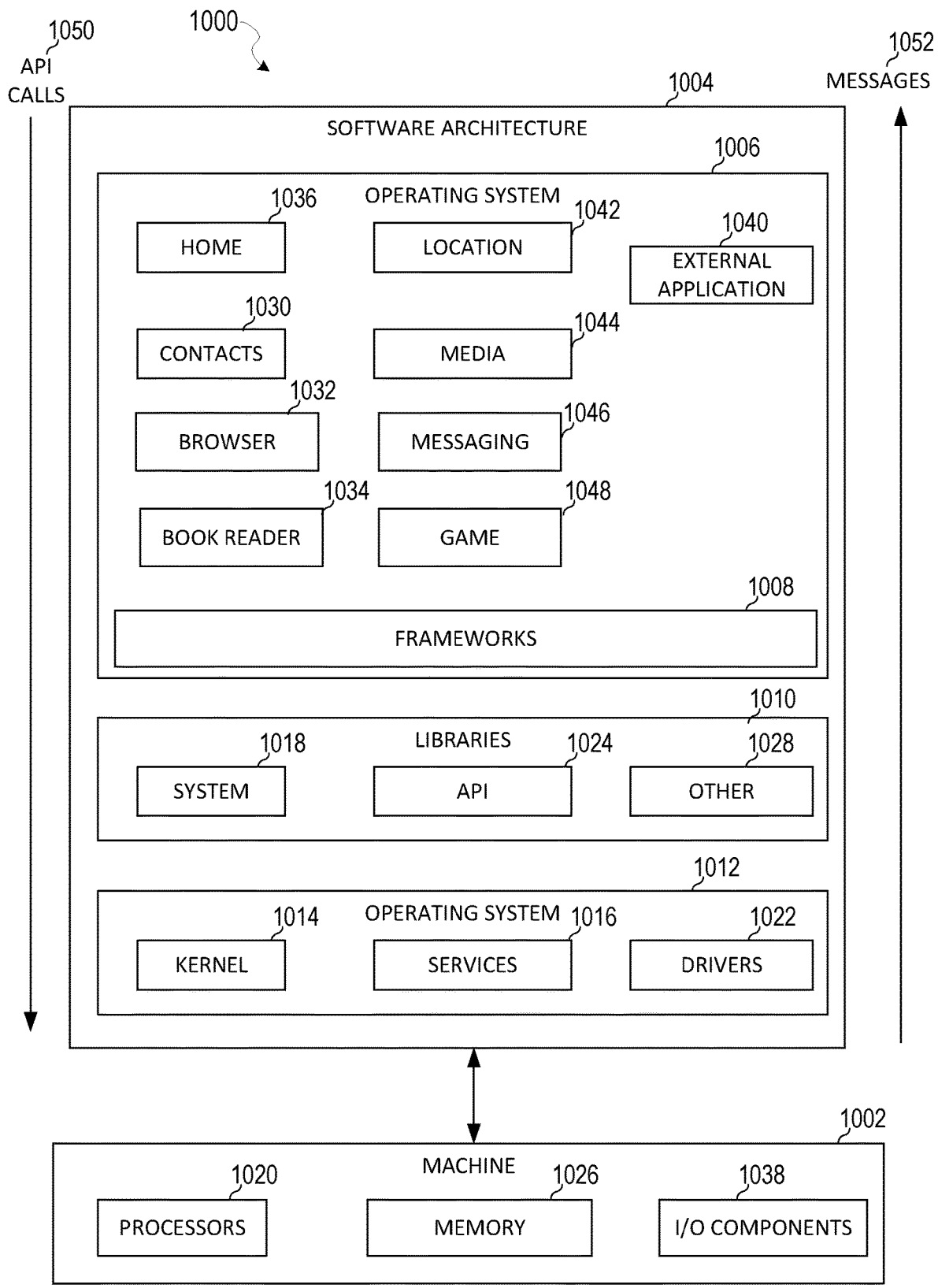
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications, such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the external application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various some examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other some examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising: accessing, by one or more processors of an automatic speech recognition (ASR) engine, a language model (LM) that includes a plurality of n-grams, each of the plurality of n-grams comprising a respective sequence of words and a corresponding LM score, the ASR engine comprising an acoustic component and a decoder;
   converting, by the acoustic component, voice input into logits of inferred characters of phonemes; receiving a list of words associated with a group classification, each word in the list of words being associated with a respective weight;
   computing, based on each of the corresponding LM scores of the plurality of n-grams, a probability that a given word in the list of words associated with the group classification appears in an n-gram in the LM comprising an individual sequence of words;
   identifying an individual portion of words in the list of words that is excluded from a subset of n-grams comprising the individual sequence of words;
   combining each word in the individual portion of words with the individual sequence of words to generate one or more new n-grams to add to the subset of n-grams to form an updated subset of n-grams;
   distributing an average of probabilities computed using sums of probabilities of different words in the list of words and the individual sequence of words across n-grams in the updated subset of n-grams to associate each n-gram in the updated subset of n-grams with a particular LM score;
   adding the updated subset of n-grams comprising the one or more new n-grams to the LM;
   processing, by the decoder, the logits of inferred characters of phonemes using the LM comprising the one or more new n-grams; and
   generating a transcript of the voice input based on the logits of the inferred characters of the phonemes that have been processed using the LM.

2. The method of claim 1, further comprising:
   identifying the subset of n-grams of the plurality of n-grams that includes a first portion of words in the list of words associated with the group classification in combination with the individual sequence of words;
   detecting that a second portion of words in the list of words is excluded from the subset of n-grams;
   adding the one or more new n-grams to the LM comprising the second portion of words in the list of words in combination with the individual sequence of words; and
   assigning one or more LM scores respectively to the one or more new n-grams based on the LM score of each n-gram in the subset of n-grams and respective weights of the words in the list of words.

3. The method of claim 1, wherein the list of words is associated with a class comprising places or locations, further comprising:
- accessing a factual information source associated with the places or locations; and
- generating a first weight of a first word in the list of words based on a population size, a size of a region, a population density, or parameter specified by the factual information source for a place or location represented by the first word.

4. The method of claim 1, further comprising:
- querying the LM to obtain a complete list of n-grams that includes any of the words in the list of words;
- identifying a first portion of n-grams of the complete list of n-grams that includes a same sequence of words;
- computing a quantity representing a total number of n-grams in the LM that include the same sequence of words; and
- generating a relevance metric based on a ratio of the first portion of n-grams to the quantity representing the total number of n-grams in the LM that include the same sequence of words.

5. The method of claim 4, further comprising:
- comparing the relevance metric to a threshold percentage;
- in response to determining that the relevance metric transgresses the threshold percentage, associating a group token with the first portion of n-grams of the complete list of n-grams that includes the same sequence of words; and
- using the group token to identify the subset of n-grams of the plurality of n-grams that includes a first portion of words in the list of words.

6. The method of claim 1, further comprising:
- determining that the individual sequence of words is part of a prefix of the subset of n-grams comprising a first portion of words of the list of words, wherein each word in the first portion of words of the list of words appears as a suffix following the prefix of the subset of n-grams.

7. The method of claim 6, further comprising:
- obtaining a first LM score of a first n-gram in the subset of n-grams;
- obtaining a second LM score of a second n-gram in the subset of n-grams; and
- computing the probability as a sum of the first and second LM scores.

8. The method of claim 6, further comprising:
- identifying a second portion of words in the list of words that is excluded from the subset of n-grams comprising the individual sequence of words;
- combining each word in the second portion of words with the individual sequence of words to add respective n-grams of the one or more new n-grams to the subset of n-grams to form an updated subset of n-grams; and
- distributing the probability across n-grams in the updated subset of n-grams to associate each n-gram in the updated subset of n-grams with the particular LM score.

9. The method of claim 8, further comprising:
- dividing the probability across the n-grams in the updated subset of n-grams according to a respective weight of each word in the list of words.

10. The method of claim 6, further comprising:
- identifying a second portion of words in the list of words that is excluded from the subset of n-grams comprising the individual sequence of words;
- combining each word in the second portion of words with the individual sequence of words to add respective n-grams of the one or more new n-grams to the subset of n-grams to form an updated subset of n-grams; and
- determining that a first word in the second portion of words has a first weight that matches a second weight associated with a second word in the first portion of words.

11. The method of claim 10, further comprising:
- obtaining the LM score of a first n-gram in the updated subset of n-grams comprising the second word; and
- associating the LM score of the first n-gram with a second n-gram in the updated subset of n-grams comprising the first word, wherein the list of words comprises names of numbers, wherein the names of numbers are arranged sequentially in number order, and wherein a first portion of the names of the numbers that sequentially precedes a second portion of the names of the numbers is associated with a first weight that is greater than a second weight associated with the second portion of the names of the numbers.

12. The method of claim 1, wherein the list of words is associated with a class comprising people names, further comprising:
- accessing a factual information source associated with the people names; and
- generating a first weight of a first word in the list of words based on a frequency of appearance or popularity of the first word specified by the factual information source.

13. The method of claim 10, further comprising:
- determining that the first word in the second portion of words has a first weight that matches a third weight associated with a third word in the first portion of words;
- obtaining an individual LM score of a second n-gram in the updated subset of n-grams comprising the third word;
- computing an average of the LM scores of a first n-gram and the second n-gram; and
- associating the average of the LM scores of the first and second n-grams with a second n-gram in the updated subset of n-grams comprising the first word.

14. The method of claim 1, further comprising:
- determining that the individual sequence of words is part of a suffix of the subset of n-grams comprising a first portion of words of the list of words, wherein each word in the first portion of words of the list of words appears as a prefix preceding the suffix of the subset of n-grams.

15. The method of claim 14, further comprising:
- computing a sum of the weights associated with the list of words;
- obtaining a first LM score of a first n-gram in the subset of n-grams;
- obtaining a second LM score of a second n-gram in the subset of n-grams;
- computing the probability as a function of a first ratio of the weight associated with a first word in the first portion of words and the computed sum combined with the first LM score and a second ratio of the weight associated with a second word in the first portion of words and the computed sum combined with the second LM score; and
- associating the computed probability with the one or more new n-grams.

16. The method of claim 1, further comprising:
determining that the individual sequence of words includes a second word in a first portion in the list of words.

17. The method of claim 16, further comprising:
computing a first probability as a function of a first sum of one or more probabilities of the individual sequence of words and a first word in the list of words; and
computing a second probability as a function of a second sum of one or more probabilities of the individual sequence of words and a second word in the list of words.

18. The method of claim 17, further comprising:
computing the average based on the first and second probabilities.

19. A system comprising: at least one processor configured to perform operations comprising: accessing, by an automatic speech recognition (ASR) engine, a language model (LM) that includes a plurality of n-grams, each of the plurality of n-grams comprising a respective sequence of words and a corresponding LM score, the ASR engine comprising an acoustic component and a decoder;
converting, by the acoustic component, voice input into logits of inferred characters of phonemes; receiving a list of words associated with a group classification, each word in the list of words being associated with a respective weight;
computing, based on each of the corresponding LM scores of the plurality of n-grams, a probability that a given word in the list of words associated with the group classification appears in an n-gram in the LM comprising an individual sequence of words;
identifying an individual portion of words in the list of words that is excluded from a subset of n-grams comprising the individual sequence of words;
combining each word in the individual portion of words with the individual sequence of words to generate one or more new n-grams to add to the subset of n-grams to form an updated subset of n-grams;
distributing an average of probabilities computed using sums of probabilities of different words in the list of words and the individual sequence of words across n-grams in the updated subset of n-grams to associate each n-gram in the updated subset of n-grams with a particular LM score;
adding the updated subset of n-grams comprising the one or more new n-grams to the LM;
processing, by the decoder, the logits of inferred characters of phonemes using the LM comprising the one or more new n-grams; and
generating a transcript of the voice input based on the logits of the inferred characters of the phonemes that have been processed using the LM.

20. A non-transitory machine-readable storage medium that includes instructions that, when executed by one or more processors, cause the one or more processors to perform operations comprising: accessing, by an automatic speech recognition (ASR) engine, a language model (LM) that includes a plurality of n-grams, each of the plurality of n-grams comprising a respective sequence of words and a corresponding LM score, the ASR engine comprising an acoustic component and a decoder;
converting, by the acoustic component, voice input into logits of inferred characters of phonemes;
receiving a list of words associated with a group classification, each word in the list of words being associated with a respective weight;
computing, based on each of the corresponding LM scores of the plurality of n-grams, a probability that a given word in the list of words associated with the group classification appears in an n-gram in the LM comprising an individual sequence of words;
identifying an individual portion of words in the list of words that is excluded from a subset of n-grams comprising the individual sequence of words;
combining each word in the individual portion of words with the individual sequence of words to generate one or more new n-grams to add to the subset of n-grams to form an updated subset of n-grams;
distributing an average of probabilities computed using sums of probabilities of different words in the list of words and the individual sequence of words across n-grams in the updated subset of n-grams to associate each n-gram in the updated subset of n-grams with a particular LM score;
adding the updated subset of n-grams comprising the one or more new n-grams to the LM;
processing, by the decoder, the logits of inferred characters of phonemes using the LM comprising the one or more new n-grams; and
generating a transcript of the voice input based on the logits of the inferred characters of the phonemes that have been processed using the LM.

* * * * *

UNITED STATES PATENT AND TRADEMARK OFFICE
CERTIFICATE OF CORRECTION

| | | |
|---|---|---|
| PATENT NO. | : 12,236,946 B2 | Page 1 of 1 |
| APPLICATION NO. | : 17/821431 | |
| DATED | : February 25, 2025 | |
| INVENTOR(S) | : Assa et al. | |

It is certified that error appears in the above-identified patent and that said Letters Patent is hereby corrected as shown below:

On the Title Page

Item (73), in "Assignee", in Column 1, Line 1, delete "Inc." and insert --Inc., Santa Monica,-- therefor Item (73), in "Assignee", in Column 1, Line 1, after "Santa Monica,", insert --CA (US)--

In the Claims

In Column 36, Line 15, in Claim 1, after "comprising:", insert a linebreak

In Column 36, Line 23, in Claim 1, after "phonemes;", insert a linebreak

In Column 39, Line 19, in Claim 19, after "comprising:", insert a linebreak

In Column 39, Line 17, in Claim 19, after "comprising:", insert a linebreak

In Column 39, Line 24, in Claim 19, after "phonemes;", insert a linebreak

In Column 40, Line 19, in Claim 29, after "comprising:", insert a linebreak

Signed and Sealed this
Thirtieth Day of September, 2025

John A. Squires
*Director of the United States Patent and Trademark Office*